(12) United States Patent
Jain et al.

(10) Patent No.: US 8,072,016 B2
(45) Date of Patent: Dec. 6, 2011

(54) EPI SUBSTRATE WITH LOW DOPED EPI LAYER AND HIGH DOPED SI SUBSTRATE LAYER FOR MEDIA GROWTH ON EPI AND LOW CONTACT RESISTANCE TO BACK-SIDE SUBSTRATE

(75) Inventors: Ajay Jain, Milpitas, CA (US); Valluri R. Rao, Saratoga, CA (US); John Magana, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/242,743

(22) Filed: Sep. 30, 2008

(65) Prior Publication Data

US 2010/0264391 A1 Oct. 21, 2010

(51) Int. Cl.
*G01R 31/02* (2006.01)

(52) U.S. Cl. ............... 257/295; 257/E21.663; 365/145; 438/3

(58) Field of Classification Search ............... 257/295, 257/E21.663, E27.104; 365/145; 438/3
See application file for complete search history.

(56) References Cited

U.S. PATENT DOCUMENTS

2010/0002563 A1* 1/2010 Kim et al. .................. 369/126

\* cited by examiner

*Primary Examiner* — Thomas L Dickey
(74) *Attorney, Agent, or Firm* — Kevin A. Reif

(57) ABSTRACT

The fabrication of seek-scan probe (SSP) memory devices involves processing on both-sides of a wafer. However, there are temperature restrictions on the mover circuitry side of the wafer and doping level constrains for either side of wafer. Using a low doped EPI layer on a highly doped substrate solves this issue and provides good STO growth.

19 Claims, 2 Drawing Sheets

EPI SUBSTRATE WITH LOW DOPED EPI LAYER AND HIGH DOPED SI SUBSTRATE LAYER FOR MEDIA GROWTH ON EPI AND LOW CONTACT RESISTANCE TO BACK-SIDE SUBSTRATE

FIELD OF THE INVENTION

Embodiments of the present invention are directed to micro-electromechanical system (MEMS) memories and, more particularly, to media layers for seek-scan probe (SSP) memory devices.

BACKGROUND INFORMATION

Seek-scan probe (SSP) memories are a type of memory that uses non-volatile storage media as the data storage mechanism and offers significant advantages in both cost and performance over conventional charge-storage memories. Typical SSP memories include storage media made of materials that can be electrically switched between two or more states having different electrical characteristics such as resistance, polarization dipole direction, or some other characteristic.

SSP memories are written to by passing an electric current through the storage media or applying an electric field to the storage media. Passing a current through the storage media, or applying an electric field to the media, is typically accomplished by applying a voltage between a sharp probe tip on one side of the storage media and an electrode on the other side of the storage media.

Current SSP memories use cantilever probe tips positioned on a free end of one or more MEMS probes. The cantilever probe is anchored to a substrate (the cantilever wafer), and can be actuated to contact or de-contact the storage media on a mover that carries a storage media and is positioned over the cantilever wafer. In an idle state each MEMS probe maintains the probe tip at a certain distance from the storage media, but before the electric field or current can be applied to the storage media the probe tip must usually be brought close to, or in some cases in direct contact with, the storage media. In order to fabricate an SSP memory device based on ferroelectric media, a high-quality media film must be deposited on the mover.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

SSP memory device fabrication includes the formation of high quality crystalline PZT (Lead Zirconate Titanate) film on a template layer of strontium Titanium oxide/strontium ruthenium oxide (STO/SRO) grown on the front side of an Si substrate. The PZT film then comprises the read/write media on the front side of a mover wafer which can be scanned by the probes.

The mover wafer also gets move/sense circuitry that needs to be fabricated on the back side of this same wafer. The move/sense circuitry may be for example CMOS circuitry involving typical CMOS processing steps. Formation of this circuitry typically requires lower processing temperatures (<350° C.). Further, the mover circuitry generally requires low contact resistance to the substrate which necessitates use of high doping substrate with resistivity of 5-20 mohm-cm. Unfortunately, high doping of the substrate impacts growth of STO (insulator layer).

All of these restraints and conditions may be at odds with one another and make fabrication challenging. Current methods use a non-epitaxial (non-EPI) substrate and a compromise has to be made between low contact resistance on the wafer back-side and quality of STO/SRO/PZT growth on the front-side of the wafer. This may not be ideal.

Figure 1:
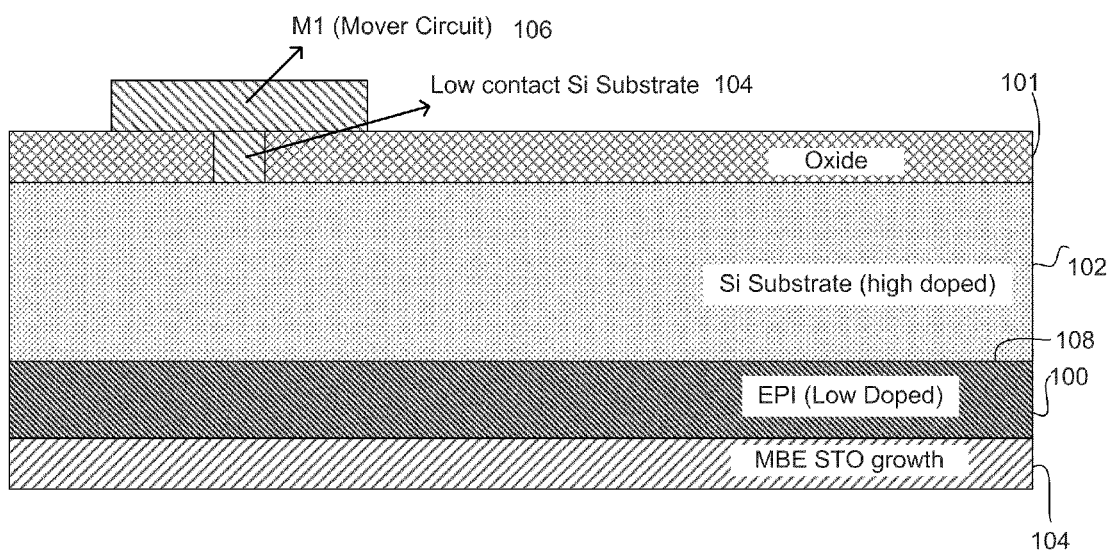
FIG. 1 is a wafer having a highly doped Si Substrate and a low doped EPI layer for a SPP memory device according to one embodiment.

Referring now to FIG. 1, there is shown a mover wafer for a seek-scan probe (SSP) memory having a highly doped Si substrate 102, with a lower doped EPI layer 100 on a front side and an oxide layer 101 with mover circuitry 106 on a back side.

Embodiments of the present invention use the low doping EPI layer 100 on a highly doped Si substrate 102. The low doping EPI layer 100 helps to promote high quality template STO layer 104 growth while the highly doped substrate 102 allows low contact resistance 104 on the wafer back-side which is beneficial for mover circuitry 106. While STO is shown in layer 104, SRO may also be used. The term "epitaxial" or EPI is directed to the growth of a single-crystal semiconductor film upon a single-crystal substrate. An epitaxial layer generally has the same crystallographic characteristics as the substrate material.

The EPI layer 100 provides a generally defect free layer for the STO layer 104 growth by, for example molecular beam epitaxy (MBE), because it is thought that the majority of the defects may be trapped at EPI/substrate interface 108.

As a further advantage, low doping in the EPI layer 100 may eliminate defect growth (high leakage regions) that may be formed if the low doped EPI layer 100 is not used. Low contact resistance 106 may still be made on the highly doped wafer 102 back-side even at temperatures <350° C. without formation of a high temperature salicide layer. This is beneficial since, back-side mover circuitry formation is typically limited to temperatures below 350° C.

Figure 2:
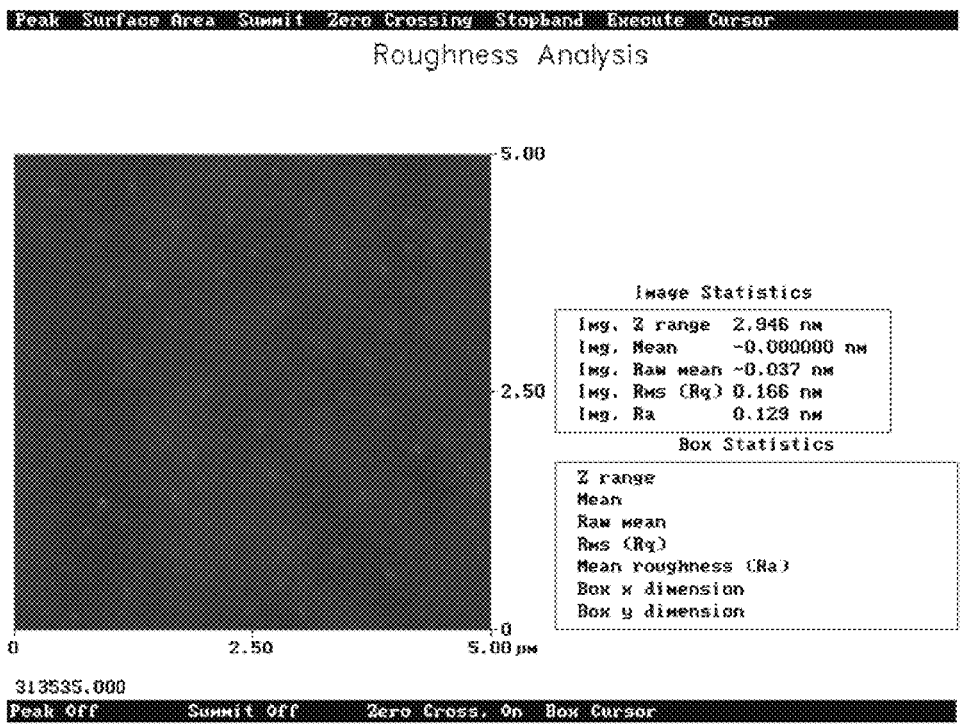
FIG. 2 is an atomic force microscopy (AFM) image of an STO growth film directly on top of a highly doped P++ substrate with defects.

FIG. 2 shows an atomic force microscopy (AFM) image of an STO growth film directly on top of a highly doped P++ substrate. Defects, referred to as "measles" are present and are characterize as high leakage regions.

Figure 3:
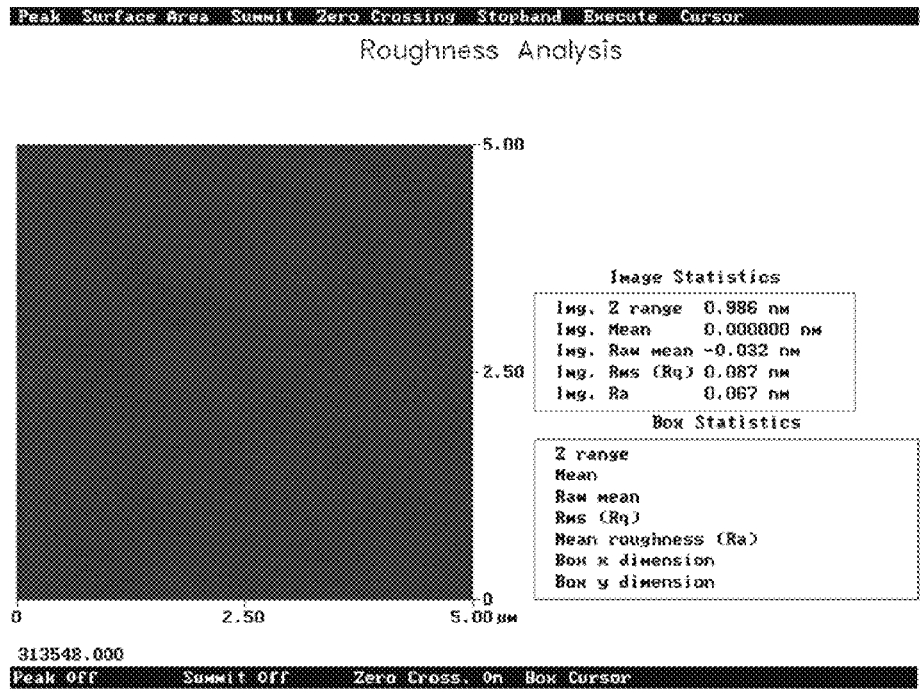
FIG. 3 is an atomic force microscopy (AFM) image of an STO growth film on a low doped EPI layer on a highly doped Si substrate according to embodiments of the invention.

FIG. 3 shows an atomic force microscopy (AFM) image of an STO growth film on a low doped EPI layer 100 on a highly doped Si substrate 102 according to embodiments of the invention. As can be seen, using this method results in an STO film layer 104 having no measles or high leakage region defects.

Thus, according to embodiments described herein, this allows independent control of high quality STO growth by MBE while still being able to make low contact resistance to substrate at temperatures below <350° C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a silicon (Si) substrate having a front side and a back side;
   an epitaxial (EPI) layer on the front side of the Si substrate;
   a template layer on the EPI layer to put a memory media; and
   circuitry fabricated on the back side of the Si substrate,
      wherein the Si substrate is highly doped and the EPI layer is lower doped.

2. The apparatus as recited in claim 1, wherein the template layer comprises strontium titanium oxide (STO).

3. The apparatus as recited in claim 1, wherein the template layer comprises strontium ruthenium oxide (SRO).

4. The apparatus as recited in claim 1 wherein the Si substrate comprises a mover wafer for a seek-scan probe (SSP) memory device.

5. The apparatus as recited in claim 4 wherein the circuitry comprises CMOS circuits processed at less than 350° C.

6. The apparatus as recited in claim 1 wherein the circuitry comprises a low contact resistance to the Si substrate.

7. The apparatus as recited in claim 6 wherein the low contact resistivity is 5-20 mohm-cm.

8. A method, comprising:
   highly doping a silicon (Si) substrate having a front side and a back side;
   providing an epitaxial (EPI) layer on the front side of the Si substrate having a lower doping;
   fabricating circuitry on the back side of the Si substrate; and
   growing a template layer on the EPI layer to put a memory media.

9. The method as recited in claim 8, further comprising:
   growing the template layer with molecular beam epitaxy (MBE).

10. The method as recited in claim 9 wherein the template layer comprises strontium Titanium oxide (STO).

11. The method as recited in claim 9 wherein the template layer comprises strontium ruthenium oxide (SRO).

12. The method as recited in claim 8, further comprising:
    processing the Si substrate at less than 350° C.

13. The method as recited in claim 12 wherein the Si substrate comprises a mover wafer for a seek-scan probe (SSP) memory device.

14. A mover wafer for a seek scan probe (SSP) memory system, comprising:
    a highly doped silicon (Si) substrate having a front side and a back side;
    a lower doped epitaxial (EPI) layer on the front side of the Si substrate;
    a template layer on the EPI layer to put a memory media; and
    mover circuitry fabricated on the back side of the Si substrate for sensing movement.

15. The mover wafer for a seek scan probe (SSP) memory system as recited in claim 14, wherein the template layer comprises strontium titanium oxide (STO).

16. The mover wafer for a seek scan probe (SSP) memory system as recited in claim 14, wherein the template layer comprises strontium ruthenium oxide (SRO).

17. The mover wafer for a seek scan probe (SSP) memory system as recited in claim 14 wherein the mover circuitry comprises CMOS circuits processed at less than 350° C.

18. The mover wafer for a seek scan probe (SSP) memory system as recited in claim 17 wherein the mover circuitry comprises a low contact resistance to the Si substrate.

19. The mover wafer for a seek scan probe (SSP) memory system as recited in claim 18 wherein the low contact resistivity is 5-20 mohm-cm.

* * * * *